(12) United States Patent
Tollman

(10) Patent No.: US 8,006,650 B2
(45) Date of Patent: Aug. 30, 2011

(54) BICYCLE TETHERING DEVICE FOR PETS

(75) Inventor: Bryan Jonathan Tollman, Toronto (CA)

(73) Assignee: Woof-Cycle, Inc., Columbia Heights, MN (US)

( * ) Notice: Subject to any disclaimer, the term of this patent is extended or adjusted under 35 U.S.C. 154(b) by 248 days.

(21) Appl. No.: 12/319,312

(22) Filed: Jan. 6, 2009

(65) Prior Publication Data

US 2009/0188441 A1   Jul. 30, 2009

Related U.S. Application Data

(60) Provisional application No. 61/023,198, filed on Jan. 24, 2008.

(51) Int. Cl.
*A01K 29/00*  (2006.01)
*B62K 27/10*  (2006.01)
(52) U.S. Cl. ..................... 119/771; 280/288.4
(58) Field of Classification Search ............ 119/771; 280/204, 292, 288.4
See application file for complete search history.

(56) References Cited

U.S. PATENT DOCUMENTS

| | | | | |
|---|---|---|---|---|
| 4,134,364 A | * | 1/1979 | Boncela | 119/703 |
| 4,854,269 A | | 8/1989 | Arntzen | 119/703 |
| 4,899,694 A | * | 2/1990 | Belluomini | 119/771 |
| 4,964,551 A | * | 10/1990 | O'Donovan et al. | 224/415 |
| 5,033,409 A | | 7/1991 | Sabot | 119/703 |
| 5,215,037 A | * | 6/1993 | Allred | 119/771 |
| 5,375,561 A | * | 12/1994 | Gundersen | 119/771 |
| 5,842,445 A | * | 12/1998 | Barbour | 119/771 |
| 6,148,772 A | * | 11/2000 | Keyek-Frannsen | 119/771 |
| 6,874,448 B1 | | 4/2005 | Fleck | 119/771 |
| 7,013,840 B2 | * | 3/2006 | Leon | 119/771 |
| 7,152,554 B2 | * | 12/2006 | Crawford | 119/496 |
| 7,174,852 B2 | | 2/2007 | Jefferson | 119/496 |
| D601,067 S | * | 9/2009 | Forrest et al. | D12/186 |
| 2005/0005876 A1 | * | 1/2005 | Calvi | 119/771 |
| 2005/0022752 A1 | * | 2/2005 | Leon | 119/771 |

* cited by examiner

*Primary Examiner* — Son T. Nguyen
(74) *Attorney, Agent, or Firm* — Mark A. Litman & Associates, P.A.

(57) ABSTRACT

A tethering system is used with a bicycle and a pet. The system has: a flexible tube having a proximal end and a distal end; the proximal end of the flexible tube having a plate connector having a bike attachment system and a removable connection with the flexible tube, the connector configured to attach to a position on a two-wheel bicycle within 15 cm of a rear axle on the two-wheel bicycle; and the distal end of the flexible tube having a connection system for a leash.

13 Claims, 3 Drawing Sheets

BICYCLE TETHERING DEVICE FOR PETS

RELATED APPLICATIONS DATA

The present Application claims priority from U.S. Provisional Patent Application Ser. No. 61/023,198 filed Jan. 24, 2008.

BACKGROUND OF THE INVENTION

1. Field of the Invention

The present technology relates to the field of pet handling equipment, pet leash equipment, and connections of pet leash systems to other equipment, especially riding apparatus such as bicycles and scooters and the like. The field of the present technology also relates to detachable tethering systems for use with pets and bicycles.

2. Background of the Art

Conventional methods of canine pet exercise such as walking at (average) human walking pace does not generally absorb the energy level of a healthy canine pet. Further, in today's fast pasted world saving time can be important and the exercise provided by the Woof-Cycle™ Product allows canine pet owners to compress the healthy exercise time of their canine pet by offering the canine a healthy combination of walking and trotting alongside a bicycle, thus making regular, healthy exercise of canine pets more likely and enjoyable for people who enjoy both canine pets and cycling. Both walks and Woof-Cycle rides are recommended for a balanced canine pet exercise routine.

Pets need regular exercise to maintain their health and many people walk their pets, especially dogs using a leash. The use of a leash is important as many jurisdictions require all dogs that are outside of a confined area to be on a leash and because control of the animal is important from a safety standpoint. Many individuals would like to combine other activities, such as bike riding, with their pet walking, but the use of a hand-held leash is inconvenient and unstable for the rider, as any significant tension on the leash can easily pull the rider's hand and tilt or overturn the bike. Numerous systems have been attempted over the years to enable leash attachment to bicycles, but without dramatic commercial success.

U.S. Pat. No. 7,174,852 describes an attachment facilitating device and a pet carrier for a bicycle. The attachment facilitating device is an elongate support for a bicycle-mounted carrier that mounts between the saddle and the handlebars of a bicycle. The support includes first and second ends. A first clamp is associated with the first end for gripping a tubular, member of the bicycle adjacent to the handlebars. A second clamp is associated with the second end for gripping a tubular member of the bicycle rearwardly of the first clamp. First and second elongate arms are slideably engageable with each other The first and second arms each have a proximal end region opposite their respective distal end regions associated with the clamps. The first arm is for supporting the carrier and is fastenable thereto. The second arm includes a linear region extending from the distal end of the second arm towards the proximal end of the second arm. An angled region is adjacent the linear region. At least two fasteners enable fastening of the first and second arms together in either of at least two orientation-differing relationships. In one of the two relationships, angling out from the linear region is in one direction. In the other of the relationships, angling out from the linear region is in a different direction.

U.S. Pat. No. 7,013,840 describes a compound leash for use with a bicycle as a person simultaneously rides the bicycle and runs the animal. Made by a dog lover and bicyclist, the leash allows the dog to range across an area extending from about 10 inches to about 3 feet laterally from one side of the bicycle and about 2 feet forward and aft of its rear axle. The leash comprises a mast, a clamp and a flexible connector joining them together. Mounted on the bicycle frame below its rear axle, the connector terminates outwardly in the mast which extends upwardly therefrom. Secured to the mast distal from the connector is at least one strap attachable to the dog's collar or harness. With the connector so mounted below the rear axle, the force from a harsh sidewise pull on the mast by the animal tends to tip the bicycle away from him rather than tipping the bicycle on the animal.

U.S. Pat. No. 6,148,772 describes a dog exercising/walking device for mounting to a bicycle. The device includes a mounting bracket having portions that engage and retain the device to the bicycle's frame. A resilient member having first and second ends is coupled to the mounting bracket at its first end such that its second end extends laterally away from the mounting bracket. The member is resiliently flexible in directions lateral to the length of the member. A dog tethering attachment ring is secured to the second end of the member allowing lead strap from the dog to be attached thereto.

U.S. Pat. No. 5,842,445 describes a generally v-shaped bar includes two legs and a radiused apex. A connector is attached to two ends of the bar opposite the apex and is adapted for connection to a front of a bicycle above a front tire. The connections of the ends of the bar to the connector are lower than the connection of the connector to the bicycle when the bicycle is upright. The bar extends away from the connector toward the apex. The legs are disposed above and on opposing sides of the front tire of the bicycle when the connector is attached to the front of the bicycle above the front tire. A clasp is configured to freely slide along the bar and to releasably and securely attach to a pet leash.

U.S. Pat. No. 5,375,561 describes a restraint for a dog or other pet is mounted on a bicycle so that the dog can run along with its master while the master rides, while maintaining the dog just far enough to the rear to avoid the bicycle's pedals and prevent the dog from dashing between the wheels. A rigid bar has a two-point attachment to the rear wheel axle and chain stay, and extends rearwardly around the rear wheel, with the point of attachment for the pet leash being in longitudinal alignment with the bicycle and close to the ground, such that the left-right centering coupled with the low point of attachment minimizes the destabilizing effects on the bicycle from the animal's tugs.

U.S. Pat. No. 5,215,037 describes a bicycle-mounted exercising device includes a mounting assembly attachable to a bicycle frame, an elongated swingarm having an inner end and an outer end for coupling to a flexible elastic strap attachable to a dog's collar, a pivot assembly connecting the inner end of the swingarm to the mounting assembly for pivotal movement of the swingarm relative to the bicycle about a generally vertical axis defined by the pivot assembly, and a mounting attachment connected to the mounting assembly for pivotal movement about the vertical axis and, in turn, supporting the swingarm closer to its inner end than to its outer end for pivotal movement about a generally horizontal axis. The pivot assembly includes a spring which engages and biases the inner end of the swingarm in a downward direction and thereby biases the outer end thereof in an upward direction. Pivoting of the swingarm about the vertical axis around the rear and between opposite sides of the bicycle permits a dog to have an expanded range of movement while keeping the dog away from the wheels of the bicycle. Pivoting of the swingarm about the horizontal axis against the load imposed by the spring on the inner end of the swingarm cushions and takes up any shock which might be produced in the device by the dog, while moving in any direction, reaching the end of the flexible elastic strap when attached to the outer end of the swingarm.

Other constructions for pet exercise attachments to bikes include U.S. Pat. Nos. 6,874,448; 5,033,409; 4,854,269; and 4,134,364. Further improved bicycle-pet tethering systems are still desired.

SUMMARY OF THE INVENTION

The present technology includes a tethering system for use with a bicycle and a pet. The system has a flexible tube with a proximal end and a distal end. The proximal end of the flexible tube has a plate connector having a bike attachment system and a removable connection with the flexible tube. The connector is configured to attach to a position on a two-wheel bicycle within 15 cm of a rear axle on the two-wheel bicycle. The distal end of the flexible tube has a connection system for a leash. The plate connector has a clamping mechanism that attaches to frame components of the two-wheel bicycle within 15 cm of the rear axle or directly to the rear axle. The flexible tube has a locking/unlocking mechanism with the plate so that the flexible tube can be unlocked and removed from the plate while the plate remains attached to the frame component or to the rear axle.

DETAILED DESCRIPTION OF THE INVENTION

Figure 1:
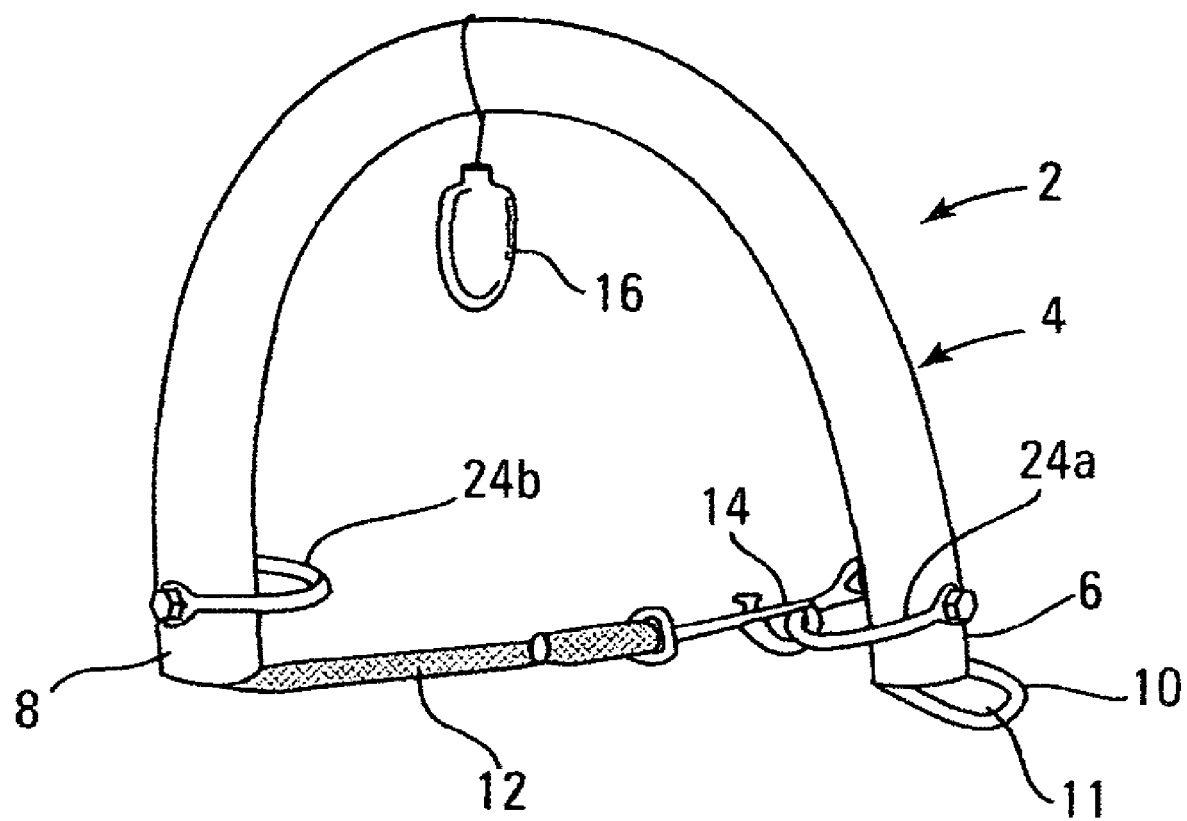
FIG. 1 shows a side view of a pet tethering device according to the presently described technology.

The present technology includes a tethering system for use with a bicycle and a pet. The system has a flexible tube with a proximal end and a distal end. The proximal end of the flexible tube has a plate connector having a bike attachment system and a removable connection with the flexible tube. The connector is configured to attach to a position on a two-wheel bicycle within 15 cm of a rear axle on the two-wheel bicycle. The distal end of the flexible tube has a connection system for a leash. The plate connector has a clamping mechanism that attaches to frame components of the two-wheel bicycle within 15 cm of the rear axle or directly to the rear axle. The flexible tube has a locking/unlocking mechanism with the plate so that the flexible tube can be unlocked and removed from the plate while the plate remains attached to the frame component or to the rear axle.

One example of a preferred pet-tethering device according to the present technology can be described as follows. A flexible, tubular structural support is provided on one end with a removable bicycle engaging connector and a leash engaging detachable connector at the other end. The tubular structural element may comprise a natural or synthetic elastomeric element such as a rubber hose, synthetic polymer hose, a reinforced rubber or reinforced synthetic polymer hose and the like. Reinforcement may be with synthetic filament (e.g., nylon, graphite, metal, ceramics and the like. The tubular support may be straight or preferably curved, such as with a radius or curvature of greater than 15 cm, greater than 25 cm, preferably more than 30 cm, up to a linear element. The tubular support may be hollow, solid or hollow at one end and solid at the other, or combinations thereof. The connector preferably overlays the rear axle, either having a hole that overlays any extension from the rear axle or which actually engages the rear axle of an extension thereof.

The removable bicycle engaging connector may comprise an element that engages one end of the tubular support in a detachable and reattachable manner, the connector attaches to a structural element of the bike, particularly the frame adjacent the rear wheel and most preferably directly into the rear axle of the bicycle. For example, in the most preferred embodiment, a plate (preferably a flat plate or a plate having a surface that mates part of the frame) is used. The plate has at least one axle-engaging hole and a peg with a lock-engaging segment is used. The hole in the preferably flat plate is sized to engage an axle on a bicycle wheel. The peg is inserted into the tubular support and preferably removably locks into the tube. It is preferred that the peg removably lock into the tubular support so that the entire pet tethering device may be removed from the bicycle, leaving only the plate attached to the bike.

The removable locking engagement to the bicycle connecting system may be effected in a number of different ways. There may be a spring loaded snap engagement, with one or two prongs engaging the tube from the peg or engaging the peg from the tube. A snake connector may grip the tube from the outside to grasp the peg (which may or may not be grooved to secure the contact with the snake through the tube. A preferred embodiment would be for the peg to have a hole therein, for an exterior post to penetrate both surfaces of the tubular support and to have a locking grip secure the exterior post against sliding removal through the tubular element. The locking grip may be permanently attached to one end of the post and have a locking/unlocking arrangement with the other end of the post, or both ends of the post may have a locking/unlocking arrangement. The locking action may be a snap arrangement that pivots from one end of the post to the other, snaps onto both posts, or itself pegs through holes in both ends of the posts as they are outside of the tubular support.

Similarly the removable locking engagement to the leash connecting system may be effected in the same number of different ways. Alternatively, but less preferentially, the leash connector may be a permanent fixture on the end of the tubular support distal from the bicycle engaging end of the tubular support. The leash is attached to the leash engaging end and the entire pet tethering device (except for the plate) can be removed.

Additional components may be added to the underlying system such as light elements (which may be powered by wheel rotation or have batteries for the light charged by wheel rotation.

Reference to the Figures will provide an even greater understanding of the technology described and claimed herein. FIG. 1 shows a tethering system 2 having a flexible structural element 4 (here shown as a hollow tube) having a proximal end 6 and a distal end 8. On the proximal end 6 is a connecting plate 10 having an engaging hole 11 slightly off-center from the flexible tube 4. On the distal end 8 of the flexible tube 4 is a leash engaging element 12 that is shown with a leash clip 14 attached to a flat plate locking/unlocking element 24a. A leash engaging element locking/unlocking device 24b is shown towards the distal end of the flexible tube 4. The shown engagement of the leash connecting element 12 (here shown as a multiloop elastic cord or bungee strap) with the leash clip 14 attached to a flat plate locking/unlocking element 24a is merely a storage position, so that when no pet is attached to the leash engaging element 12, that element will not dangle freely. Also shown is a battery powered light that can be used to alert others in the dark of the presence of an extension to a bicycle. The tethering system 2 may be attached on the left or right side of a bicycle. The leash attachment 12 may be attached to a single leash, or a yoke with two clips thereon may be used to attach two separate pets to the bicycle.

Figure 2:
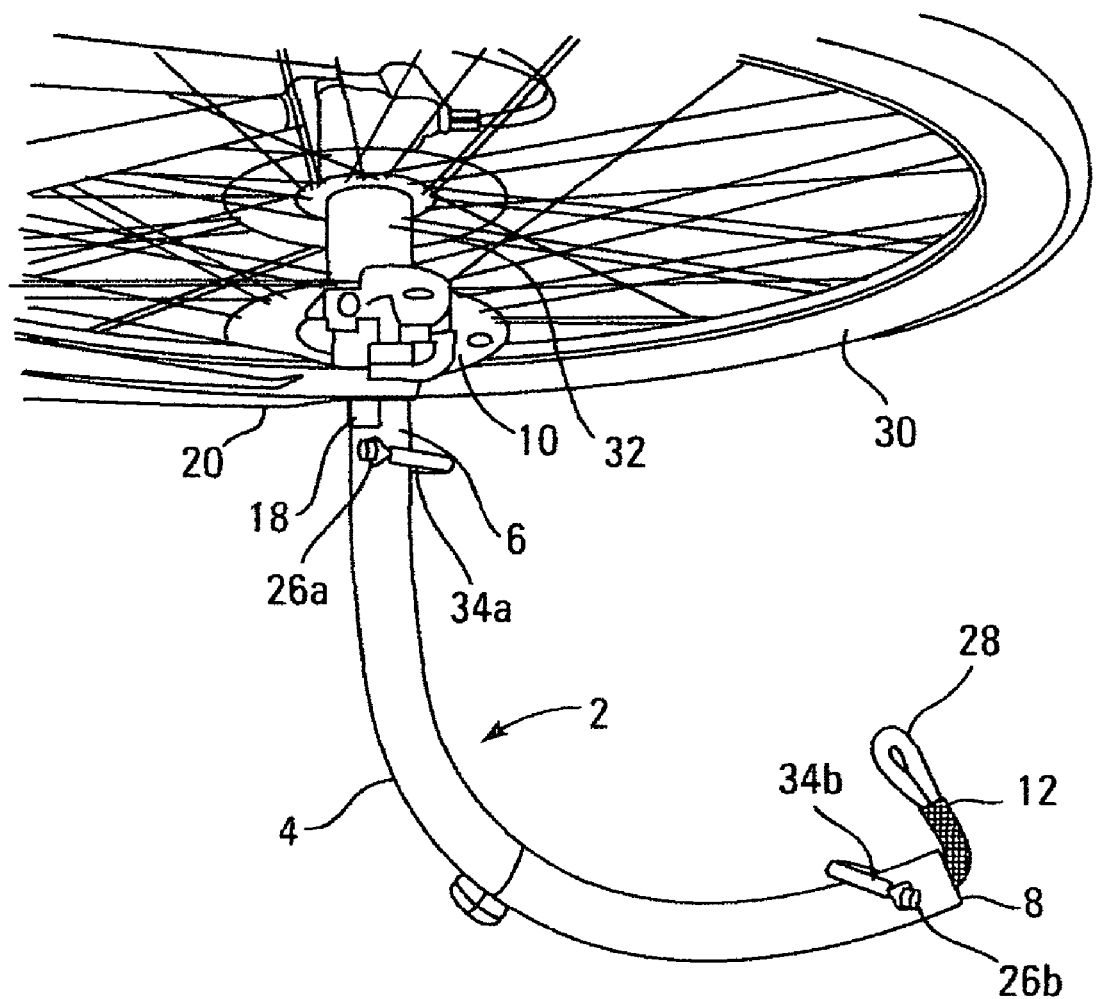
FIG. 2 shows a top view of a pet tethering device attached to a rear bicycle axle according to the presently described technology.

FIG. 2 shows a tethering system 2 attached to an axle 32 on a rear bicycle wheel 30. The proximal end 6 of the flexible tube 4 is engaged to the axle 32 by the flat plate 10 being secured between the tire 30 and the structural frame element 20 which is secured to the engaging hole 11 by a bolt 18. The proximal end 6 of the flexible tune is engaged and secured to the axle 32 with the elongated element (not shown) that is part of the flat plate 10 engaged through the pin 26a attached and locked by the clip locking element 34a. By unlocking clip locking element 34a and removing the pin 26a, the flexible tube 4 may be slid off the flay plate 10 without having to disengage the flat plate 10 from the axle 32. A similar locking system of clip locking element 34b and second pin 26b is shown at the distal end 8 of the flexible tube to engage the leash connecting element 12 having a leash clip 28 on its end.

Figure 3:
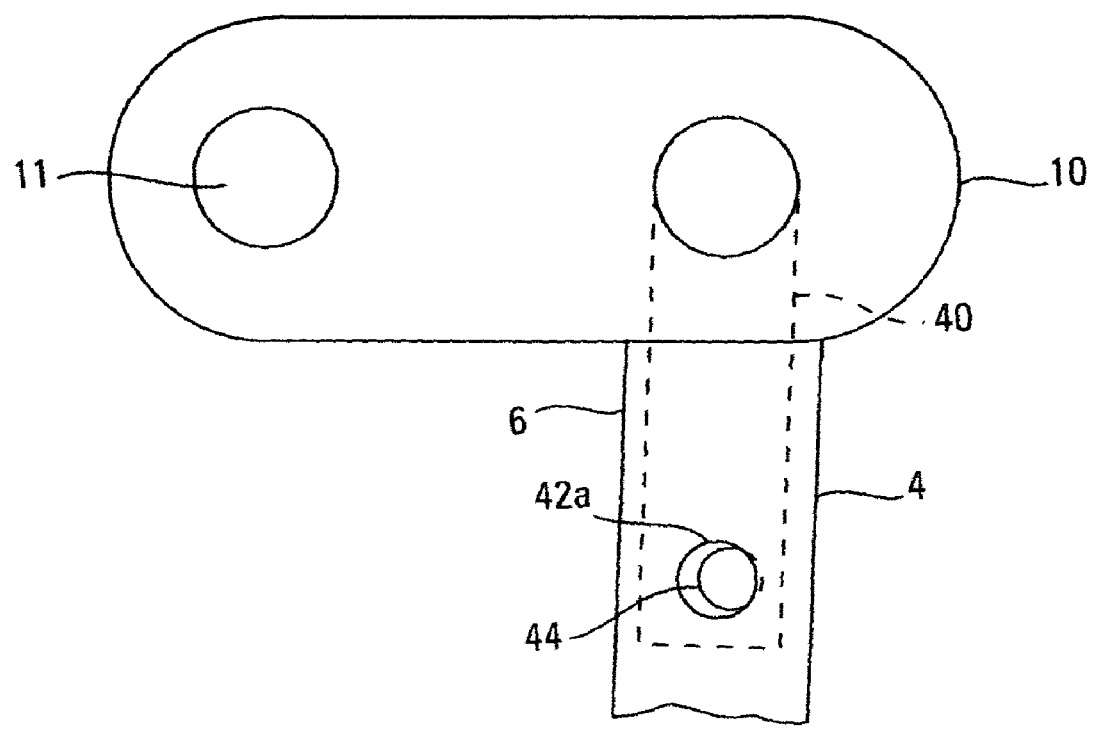
FIG. 3 shows a partially sectioned view of a pet tethering device according to the presently described technology.
Figure 3:
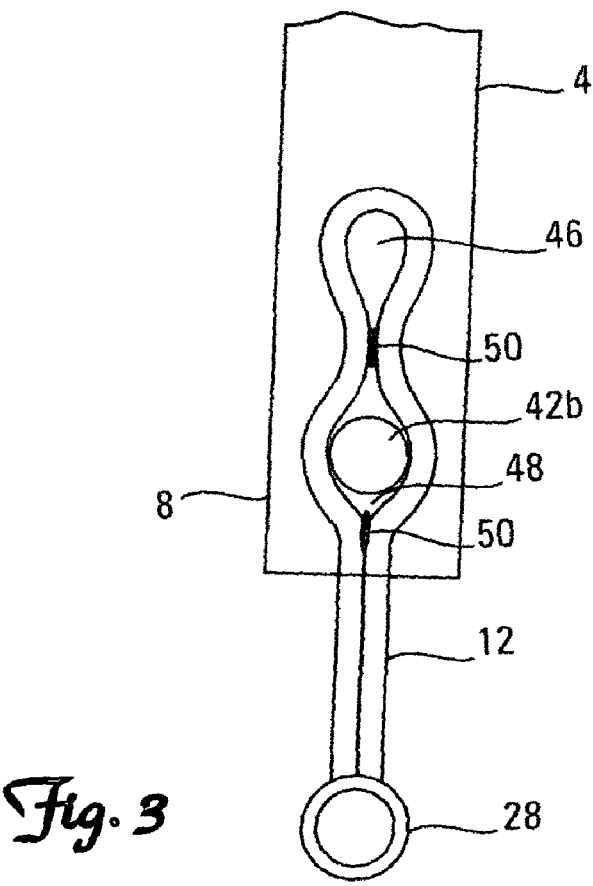

FIG. 3 shows a sectioned flexible tube 4 where the proximal end 6 is covering the elongated stem 40 in the flat plate 10. A hole 42a in the flexible tube 4 is shown slightly off centered from a hole 44 in the elongated stem 40 through which a pin (not shown) from the locking/unlocking device (not shown) would be inserted to lock the flexible tube 4 to the elongated stem 40.

In FIG. 3, the distal end 8 of the flexible tube 4 is shown with a hole 42b in the flexible tube 4 that is shown aligned with a first gap 48 in the leash attachment assembly 12 through which a pin not shown) from the locking/unlocking device (not shown) would be inserted to lock the flexible tube 4 to the leash attachment assembly 12. A second gap 46 is shown by which the length of the portion of the leash attachment assembly 12 extending out of the flexible tube 12 may be adjusted, or if the first gap 48 becomes separated, another gap 46 is available. Strengthening seam supports 50 are shown on the leash attaching element 12.

In a further general description of the present technology, we describe a product for tethering canine pet/s to a bicycle at the bicycle's rear axle. The product preferably attached to the bicycle at a point of low center of gravity on the bicycle to provide exercise to a canine pet/s by facilitating the canine pet's walking and trotting alongside a bicycle in a manner that allows for safe control of the bicycle and safe control of the canine pet/s while riding the bicycle. The product's low center of gravity attachment point reduces the risk of the cyclist being pulled off the bicycle by the canine pet's lateral movement. A short pet leash and flexible structural component (e.g., a stiff, but flexible rubber hose or reinforced elastomeric hose) provides flexibility to the connectivity between the pet(s) and the cyclist/bicycle's, absorbing much of the lateral and other movement of the canine pet(s) relative to the cyclist/bicycle during such exercise. Further, the product provides good feedback to the cyclist about the canine pets' movement and behaviour. The rubber hose's (flexible tube 4) rubber or elastomeric compound (natural or synthetic) and rounded shape reduce the risk of injury to both cyclist and canine pet/s in the event of an accident. The flexible tube should be sufficiently stiff at to require at least a two kilogram force to deflect the approximate angle from distal end to proximal end by twenty degrees and still provide some assurance that the tube will not easily bend back towards the rear tire of the bicycle. To this end, a portion of the flexible tube (particularly the proximal portion) may even be rigid and only a further portion (more towards the distal portion of the flexible tube) need be flexible. In that situation, the "flexible tube" would have a rigid proximal portion and a connection or transition into a more flexible portion that would allow elastic reorientation of the distal end so that the distal end of the flexible tube would be closer to the rear of the rear tire than the axle, preferably by at least 3-6 inches. The product can be effectively used with two canine pets, where the canine pets are calm submissive animals, accustomed to cooperating together as a pack, by using a yoke that will separate the leashes and allow each dog some personal space.

One aspect of the present technology is referred to as the "Woof-Cycle"™ product that provides exercise to the canine pet/s (not the cyclist or minimally to the cyclist) while reducing the risk of the canine pet/s causing the cyclist to fall off the bicycle. This is accomplished by attaching the product at the bicycle's rear-axle fastener which creates connectivity between the canine pet and the cyclist/bicycle at a low center-of-gravity point and using shaped (e.g., rounded) flexible materials to avoid or reduce injury to cyclist and canine pet/s in the event of an accident.

Lateral and other movement of the canine pet/s at the end of the product is first absorbed by the Short Pet-Leash's between the canine pets' collar and the product, secondly by the flexible tube which is positioned between the Short Pet-Leash/s and the rear axle contact point on the bicycle. Further, the flexible tube has the flexibility described, the length and the rigidity/strength to keep the canine pet/s away from the rotating rear bicycle wheel. Thirdly, the canine pets' movement at the end of the product is further absorbed by such forces working on the bicycle's rear axle which brings the cyclist's weight, gravity and the bicycle's rear (front tire plays a less significant role) tire's surface-traction into play to provide counter-force, reducing and neutralizing most of the lateral and other forces coming from the canine pets' movement at the end of the Product.

The result is that the bicycle does not move dramatically laterally as a result of the Product usage during reasonable riding conditions (reasonable riding conditions defined as: rider ability plus road conditions that are not slippery plus reasonable canine pet/s behavior). The best results are achieved on a dry asphalt or road surface where the rubber bicycle tire has good surface grip, with good results on gravel surfaces, medium to good results on more slippery wet surfaces. The product was exposed to hot summer temperatures and snow/ice covered winter sidewalk and other surfaces with two dogs attached to the product simultaneously with the physics of the product holding up well to summer and fall temperatures and slow, careful winter riding and experienced canine pets. Studded snow/ice bicycle tires were not used during the testing phase but are recommended for cold winter climates with experience cycling in such conditions, calm submissive canine pet/s and canine-shoes to protect their feet from the cold and salt (used to melt sidewalk ice/snow).

The cyclist may get some modest exercise benefit from Woof-Cycle™ Product activity but it is not the primary focus of the product. The primary goal of the Product is to deliver beneficial walking and trotting (only) type exercise to a healthy (such health to be determined by a Veterinarian for each canine pet) canine pet/s as part of their excise routine. The duration of such beneficial exercise is related to an individual canine pet's age, size, breed, weight and medical history (such health to be determined by an informed caring canine pet owner and a Veterinarian for each canine pet). The Product provides a combination of walking and trotting to a canine pet/s alongside a bicycle while the bicycle is being ridden or pushed (pushing a bicycle is required in some justifications on sidewalks or where the sidewalk has many pedestrians) by the cyclist.

It is desirable to note that to ensure safe healthy exercise for the canine/pets, such canine pets will require daily nutrition, hydration and rest (before, during and after such exercise) to support Woof-Cycle™ product's exercise. Further, a gradual increase in such exercise duration and intensity is important to the healthy progressive fitness of the individual canine pet/s. The inventor does not exceed forty minutes of combined walking and trotting with frequent stops for water/rest of his canine pets. Longer rides should have intermittent rest and walking periods so as not to over-exert/injure the canine pet/s. Further, using the Product with (not more than) two canine pets requires additional bicycle handling ability, canine pet management skills and calm submissive animals.

Traditional short walks for canine pets daily, while very beneficial, do not generally absorb the energy level of a healthy canine pet. Further, in today's fast paced world the Product provides adequate healthy exercise in a shorter period of time because the Product facilitates and promotes a healthy combination of walking and trotting alongside a bicycle, thus making adequate daily healthy exercise of a canine pet/s more likely and enjoyable for busy people. Both walks and Woof-Cycle™ products rides are recommended for a balanced canine pet exercise routine.

The Product can be made from a variety of components/materials (in a variety of colors) including but not limited to a Metal Block-Hitch, Metal Safety Pin Fasteners, Rubber Hose, Leash-Rope, a Leash-Spring Clamp, a safety colored Fabric Sleeve and a Mini Safety-Light.

What is claimed:

1. A tethering system for use with a bicycle and a pet comprising:
   a flexible tube having a proximal end and a distal end;
   the proximal end of the flexible tube having a plate connector having a bike attachment system and a removable connection with the flexible tube, the connector configured to attach to a position on a two-wheel bicycle within 15 cm of a rear axle on the two-wheel bicycle; and
   the distal end of the flexible tube having a connection system for a leash, wherein the plate connector has a hole sized to attach directly to a rear axle of the two-wheel bicycle and a plate member that extends away from the plate connector to engage the flexible tube with a locking/unlocking mechanism, wherein the locking/unlocking mechanism comprises an elongated element that passes into a first side of the flexible tube, the elongated member engages the plate member and then the elongated member passes out of a second side of the flexible tube.

2. The system of claim 1 wherein the elongated member has a locking connector on at least one side of the elongated member, and when the locking connector is unlocked, the elongated member can be pulled out of the flexible tube, disengaging the plate member and allowing the flexible tube to be separated from the plate member while the plate member remains attached to the rear axle.

3. The system of claim 2 wherein the pivoting clamp snap engages the second end of the peg that extends out of the flexible tube approximately opposite to where the peg enters the flexible tube.

4. The system of claim 2 wherein the hole in the plate is locked onto the rear axle of a two-wheel bicycle.

5. The system of claim 1 wherein the locking connector comprises a peg that passes completely through the flexible tube, the peg having a first end and a second end, the first end of the peg having a pivoting clamp that extends from the first end of the peg, around the flexible tube and removably engages the second end of the peg to prevent the peg from sliding out of the flexible tube.

6. The system of claim 5 wherein the hole in the plate is locked onto the rear axle of a two-wheel bicycle.

7. A tethering system for use with a bicycle and a pet comprising:
   a flexible tube having a proximal end and a distal end;
   the proximal end of the flexible tube having a plate connector having a bike attachment system and a removable connection with the flexible tube, the connector configured to attach to a position on a two-wheel bicycle within 15 cm of a rear axle on the two-wheel bicycle; and
   the distal end of the flexible tube having a connection system for a leash,
   wherein the flexible tube has a locking/unlocking mechanism with the plate so that the flexible tube can be unlocked and removed from the plate while the plate remains attached to the frame component,
   wherein the flexible tube has a locking/unlocking mechanism with the plate so that the flexible tube can be unlocked and removed from the plate while the plate remains attached to the frame component, and
   wherein the locking connector for the leash comprises a peg that passes completely through the flexible tube and engages a leash or leash connector, the peg having a first end and a second end, the first end of the peg having a pivoting clamp that extends from the first end of the peg, around the flexible tube and removably engages the second end of the peg to prevent the peg from sliding out of the flexible tube.

8. The system of claim 7 wherein a leash connector extends into the distal end of the flexible tube and is penetrated by the peg of the locking connector for the leash so that when the peg for the locking connector for the leash is withdrawn, the leash connector can be withdrawn from the distal end of the flexible tube.

9. The system of claim 8 wherein the leash connector has multiple loops along its length, and length of extension of the leash connector from the distal end can be adjusted by selecting different loops along the length of the leash connector.

10. The system of claim 9 wherein the hole in the plate is locked onto the rear axle of a two-wheel bicycle.

11. The system of claim 8 wherein the hole in the plate is locked onto the rear axle of a two-wheel bicycle.

12. The system of claim 7 wherein the plate connector has a hole sized to attach directly to a rear axle of the two-wheel bicycle and a plate member that extends away from the plate connector to engage the flexible tube with a locking/unlocking mechanism, and wherein the hole in the plate is locked onto the rear axle of a two-wheel bicycle.

13. The system of claim 7 wherein the hole in the plate is locked onto the rear axle of a two-wheel bicycle.

* * * * *